(12) United States Patent
Zehner et al.

(10) Patent No.: US 9,041,686 B2
(45) Date of Patent: May 26, 2015

(54) ELECTRONIC DEVICE COMPONENT STACK

(71) Applicant: Amazon Technologies, Inc., Reno, NV (US)

(72) Inventors: Robert Waverly Zehner, Los Gatos, CA (US); Hannah Rebecca Lewbel, Campbell, CA (US); Anoop Menon, Capitola, CA (US); Scott M. Dylewski, San Francisco, CA (US); Kari J. Rinko, Helsinki (FI)

(73) Assignee: Amazon Technologies, Inc., Reno, NV (US)

( * ) Notice: Subject to any disclaimer, the term of this patent is extended or adjusted under 35 U.S.C. 154(b) by 169 days.

(21) Appl. No.: 13/647,985

(22) Filed: Oct. 9, 2012

(65) Prior Publication Data

US 2014/0062939 A1 Mar. 6, 2014

Related U.S. Application Data

(60) Provisional application No. 61/695,284, filed on Aug. 30, 2012, provisional application No. 61/696,025, filed on Aug. 31, 2012.

(51) Int. Cl.
*G06F 3/041* (2006.01)
*G06F 3/044* (2006.01)
*G02B 6/00* (2006.01)

(52) U.S. Cl.
CPC . *G06F 3/044* (2013.01); *G02B 6/00* (2013.01)

(58) Field of Classification Search
None
See application file for complete search history.

(56) References Cited

U.S. PATENT DOCUMENTS

| | | | |
|---|---|---|---|
| 6,362,815 B1* | 3/2002 | Leenhouts | 345/173 |
| 7,889,284 B1* | 2/2011 | Nemeth et al. | 349/12 |
| 2002/0101399 A1 | 8/2002 | Kubo et al. | |
| 2009/0179870 A1 | 7/2009 | Scholz et al. | |
| 2009/0190373 A1 | 7/2009 | Bita et al. | |
| 2010/0226118 A1 | 9/2010 | Baar | |
| 2011/0095999 A1 | 4/2011 | Hayton | |
| 2011/0169767 A1* | 7/2011 | Weindorf et al. | 345/174 |
| 2011/0273906 A1* | 11/2011 | Nichol et al. | 362/607 |
| 2012/0026106 A1* | 2/2012 | Chiu et al. | 345/173 |
| 2012/0200532 A1 | 8/2012 | Powell et al. | |

OTHER PUBLICATIONS

The PCT Search Report and Written Opinion mailed Mar. 11, 2014 for PCT application No. PCT/US13/56817, 7 pages.

* cited by examiner

*Primary Examiner* — Joseph Haley
(74) *Attorney, Agent, or Firm* — Lee & Hayes, PLLC

(57) ABSTRACT

Electronic devices that include reflective displays for rendering content, touch sensors layered atop the reflective displays for detecting touch inputs, front lights layered atop the touch sensors for lighting the reflective displays and antiglare components for reducing glare caused by ambient light. This disclosure also describes techniques for assembling electronic devices including these component stacks.

34 Claims, 5 Drawing Sheets

ELECTRONIC DEVICE COMPONENT STACK

RELATED APPLICATIONS

The present application is a continuation of and claims priority to pending U.S. Provisional Application Ser. No. 61/695,284, filed on Aug. 30, 2012, entitled "Electronic Device Component Stack", which is incorporated by reference herein in its entirety. The present application is also a continuation of and claims priority to pending U.S. Provisional Application Ser. No. 61/696,025, filed on Aug. 31, 2012, also entitled "Electronic Device Component Stack", which is incorporated by reference herein in its entirety.

BACKGROUND

A large and growing population of users is enjoying entertainment through the consumption of digital content, such as music, movies, images, electronic books, and so on. The users employ various electronic devices to consume such content. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, electronic devices that include reflective displays for rendering content, capacitive touch sensors layered atop the reflective displays for detecting touch inputs, front lights layered atop the touch sensors for lighting the reflective displays and antiglare components for reducing glare caused by ambient light. This disclosure also describes techniques for assembling electronic devices including these component stacks.

Figure 1:
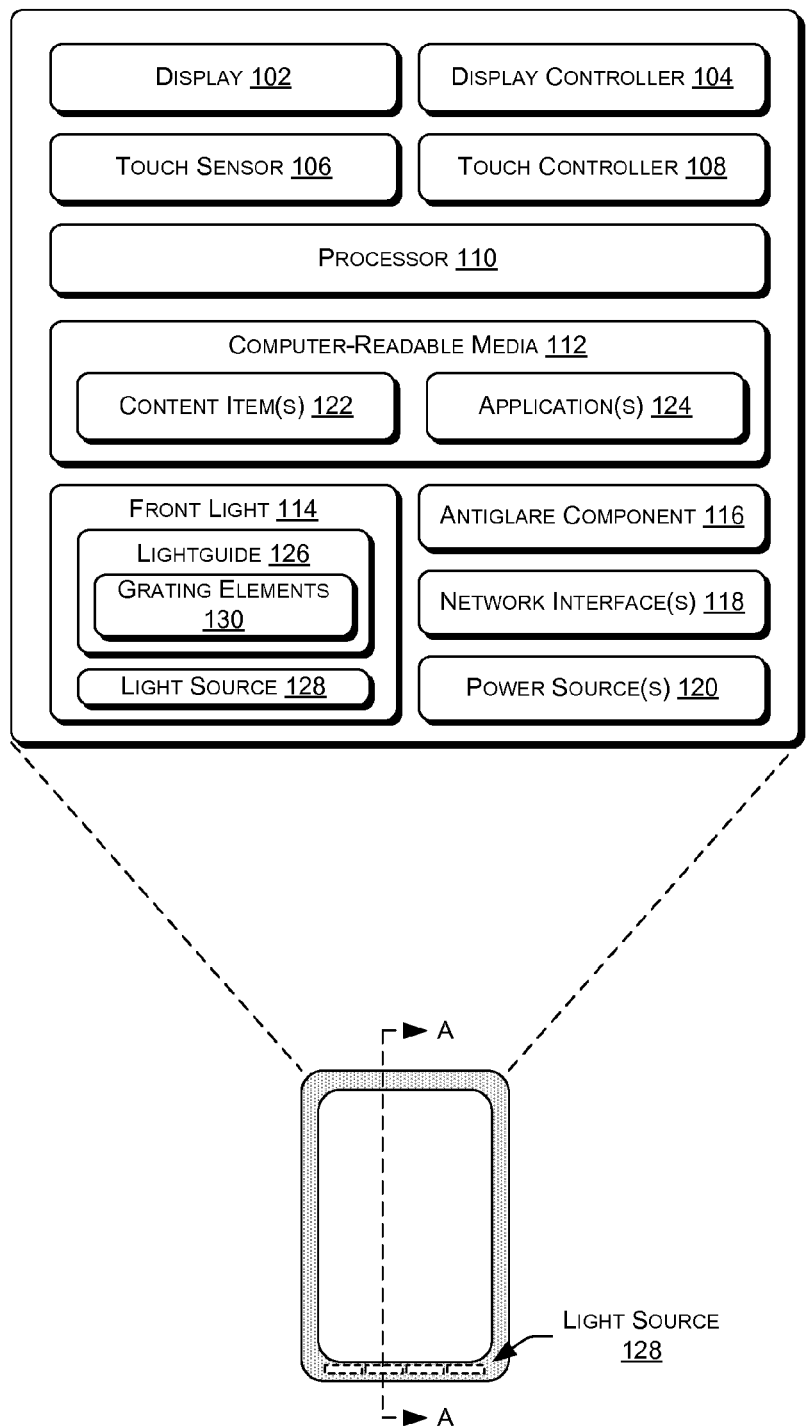
FIG. 1 illustrates an example electronic device that includes a display, a touch sensor atop the display, a front light atop the touch sensor and an antiglare component atop the front light.

FIG. 1 illustrates an example electronic device 100 that includes the component stack introduced above. The device 100 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). In addition, while FIG. 1 illustrates several example components of the electronic device 100, it is to be appreciated that the device 100 may also include other conventional components, such as an operating system, system busses, input/output components, and the like.

Regardless of the specific implementation of the electronic device 100, the device 100 includes a display 102 and a corresponding display controller 104. The display 102 may represent a reflective display in some instances, such as an electronic paper display, a reflective LCD display or the like.

Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display.

In one implementation, the display 102 comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the display 102 comprises an electrophoretic display that includes oppositely charged light and dark particles. In order to create white, the display controller moves the light particles to the front side of the display by creating a corresponding charge at an electrode near the front and moves the dark particles to the back of the display by creating a corresponding charge at an electrode near the back. In order to create black, meanwhile, the controller changes the polarities and moves the dark particles to the front and the light particles to the back. Furthermore, to create varying shades of gray, the controller may utilize different arrays of both light and dark particles.

Of course, while two different examples have been given, it is to be appreciated that the reflective displays described herein may comprise any other type of electronic-paper technology or reflective-display technology, such as gyricon displays, electrowetting displays, electrofluidic displays, interferometric modulator displays, cholestric liquid crystal displays, and the like. In addition, while some of the examples described above are discussed as rendering black, white, and varying shades of gray, it is to be appreciated that the described techniques apply equally to reflective displays capable of rendering color pixels. As such, the terms "white", "gray", and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter.

In addition to including the display 102, FIG. 1 illustrates that the device 100 includes a touch sensor 106 and a touch controller 108. In some instances, at least one touch sensor 108 resides atop the display 102 to form a touch-sensitive display (e.g., an electronic paper touch-sensitive display) that is capable of both accepting user input and rendering content corresponding to the input. As described in further detail below, the touch sensor 106 may reside atop a substrate (e.g., atop a glass substrate) of the display 102.

The touch sensor 106 may comprise a capacitive touch sensor, a force sensitive resistance (FSR), an interpolating force sensitive resistance (IFSR) sensor, or any other type of touch sensor. In some instances, the touch sensor 108 is capable of detecting touches as well as determining an amount of pressure or force of these touches. In examples described below, the touch sensor 106 comprises a capacitive touch sensor.

FIG. 1 further illustrates that the electronic device includes one or more processors 110 and computer-readable media 112, as well as a front light 114 for lighting the display 102, an antiglare component 116 for reducing glare of incident light, one or more network interfaces 118 and one or more power sources 120. The network interfaces 118 may support both wired and wireless connection to various networks, such as cellular networks, radio, WiFi networks, short range networks (e.g., Bluetooth), IR, and so forth.

Depending on the configuration of the electronic device 100, the computer-readable media 112 (and other computer-readable media described throughout) is an example of computer storage media and may include volatile and nonvolatile memory. Thus, the computer-readable media 112 may include, but is not limited to, RAM, ROM, EEPROM, flash memory, or other memory technology, or any other medium which can be used to store media items or applications and data which can be accessed by the electronic device 100.

The computer-readable media 112 may be used to store any number of functional components that are executable on the processors 110, as well content items 122 and applications 124. Thus, the computer-readable media 112 may include an operating system and a storage database to store one or more content items, such as eBooks, audio books, songs, videos, still images, and the like. The computer-readable media 112 of the electronic device 100 may also store one or more content presentation applications to render content items on the device 100. These content presentation applications may be implemented as various applications depending upon the content items. For instance, the application may be an electronic book reader application for rending textual electronic books, an audio player for playing audio books or songs, a video player for playing video, and so forth.

In some instances, the electronic device 100 may couple to a cover to protect the display (and other components in the stack) of the device. In one example, the cover may include a back flap that covers a back portion of the device and a front flap that covers the display and the other components in the stack. The device 100 and/or the cover may include a sensor (e.g., a hall effect sensor) to detect when the cover is open (i.e., when the front flap is not atop the display and other components). The sensor may send a signal to the front light 114 when the cover is open and, in response, the front light 114 may illuminate the display. When the cover is closed, meanwhile, the front light 114 may receive a signal indicating that the cover has closed and, in response, the front light may turn off.

Furthermore, the amount of light emitted by the front light 114 may vary. For instance, upon a user opening the cover, the light from the front light may gradually increase to its full illumination. In some instances, the device 100 includes an ambient light sensor and the illumination of the front light 114 may be based at least in part on the amount of ambient light detected by the ambient light sensor. For instance, the front light 114 may be brighter if the ambient light sensor detects relatively little ambient light, and may be dimmer if the ambient light sensor detects a relatively large amount of ambient light.

In addition, the settings of the display 102 may vary depending on whether the front light 114 is on or off, or based on the amount of light provided by the front light 114. For instance, the electronic device 100 may implement a larger default font or a greater contrast when the light is off compared to when the light is on. In some instances, the electronic device 100 maintains, when the light is on, a contrast ratio for the display that is within a certain defined percentage of the contrast ratio when the light is off.

As described above, the touch sensor 106 may comprise a capacitive touch sensor that resides atop the display 102. The front light 114, meanwhile, may reside atop the capacitive touch sensor. In some instances, the front light 114 couples to a top surface of the capacitive touch sensor via optically clear adhesive (OCA), such as a solid OCA (SOCA) or a liquid OCA (LOCA). In the latter instances, the device 100 may be assembled by placing the LOCA atop the touch sensor 106 and, when the LOCA reaches the corner(s) and/or at least a portion of the perimeter of the touch sensor 106, UV-curing the LOCA on the corners and/or the portion of the perimeter. Thereafter, the remaining LOCA may be UV-cured and the front light 114 may couple to the LOCA. By first curing the corner(s) and/or perimeter, the techniques effectively create a barrier for the remaining LOCA and also prevent the formation of air gaps in the LOCA layer, thereby increasing the efficacy of the front light 114. In other implementations, the LOCA may be placed near a center of the top surface of the touch sensor, pressed outwards towards a perimeter of the top surface of the touch sensor and cured.

As illustrated, the front light 114 includes a lightguide 126 and a light source 128. The lightguide 126 comprises a substrate (e.g., a transparent thermoplastic such as PMMA), a layer of lacquer and multiple grating elements 130 that function to propagate light from the light source 128 towards the reflective display 102, thus illuminating the display 102. To create the grating elements, the layer of lacquer may be applied to the substrate of the lightguide 126, the grating elements may be embossed to the layer of lacquer, and the lightguide 126 may be UV-cured. Alternatively, the substrate of the lightguide and the grating elements may be manufactured as a single element, such as via an injection molding process. In some instances, the UV lacquer is made of a cross-linked, tri-functional polymer material that co-polymerizes to a plastic solid when exposed to a high-intensity UV light source. Examples of the lightguide 126 and the grating elements 130 are described in further detail below with reference to FIG. 3.

Figure 2A:
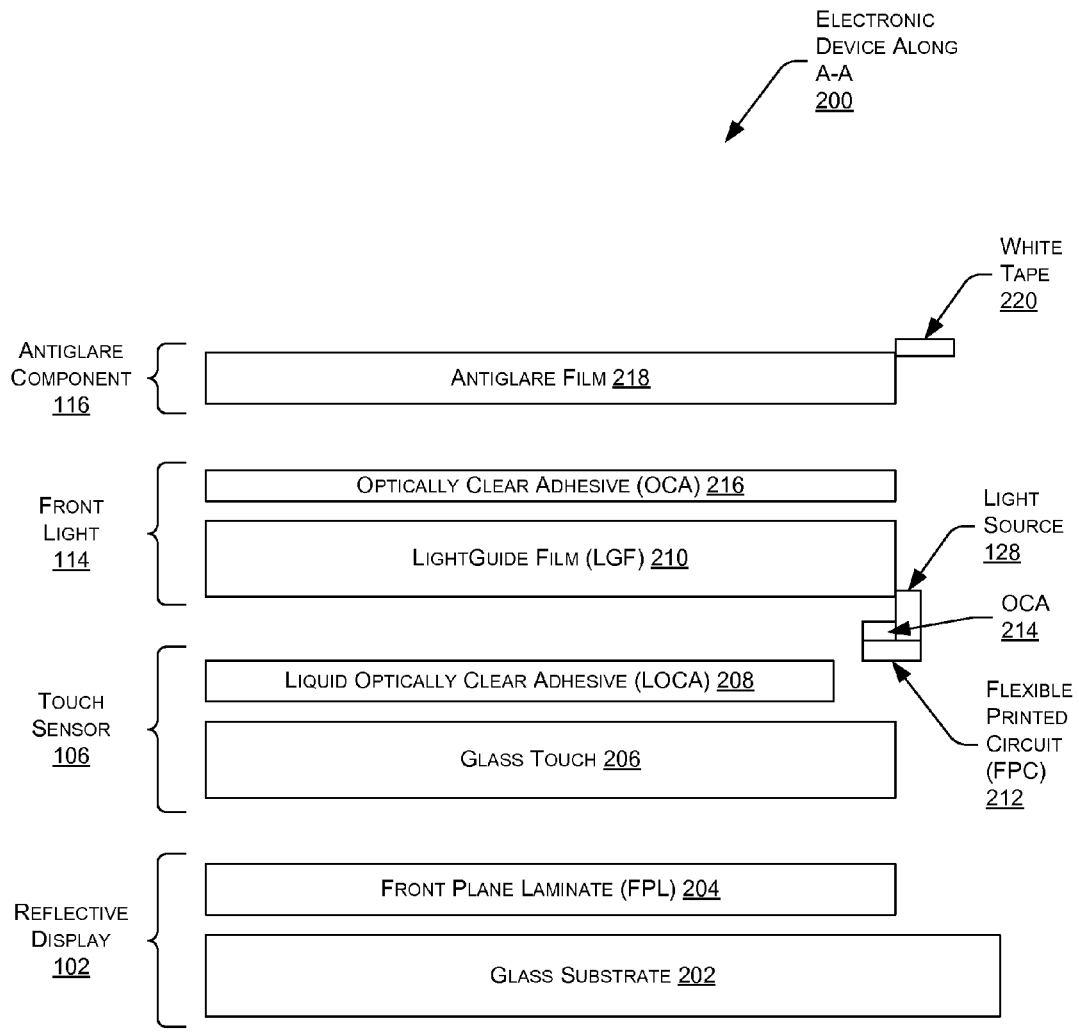
FIGS. 2A-2B each illustrates an example schematic cross-section of the electronic device of FIG. 1.
Figure 2B:
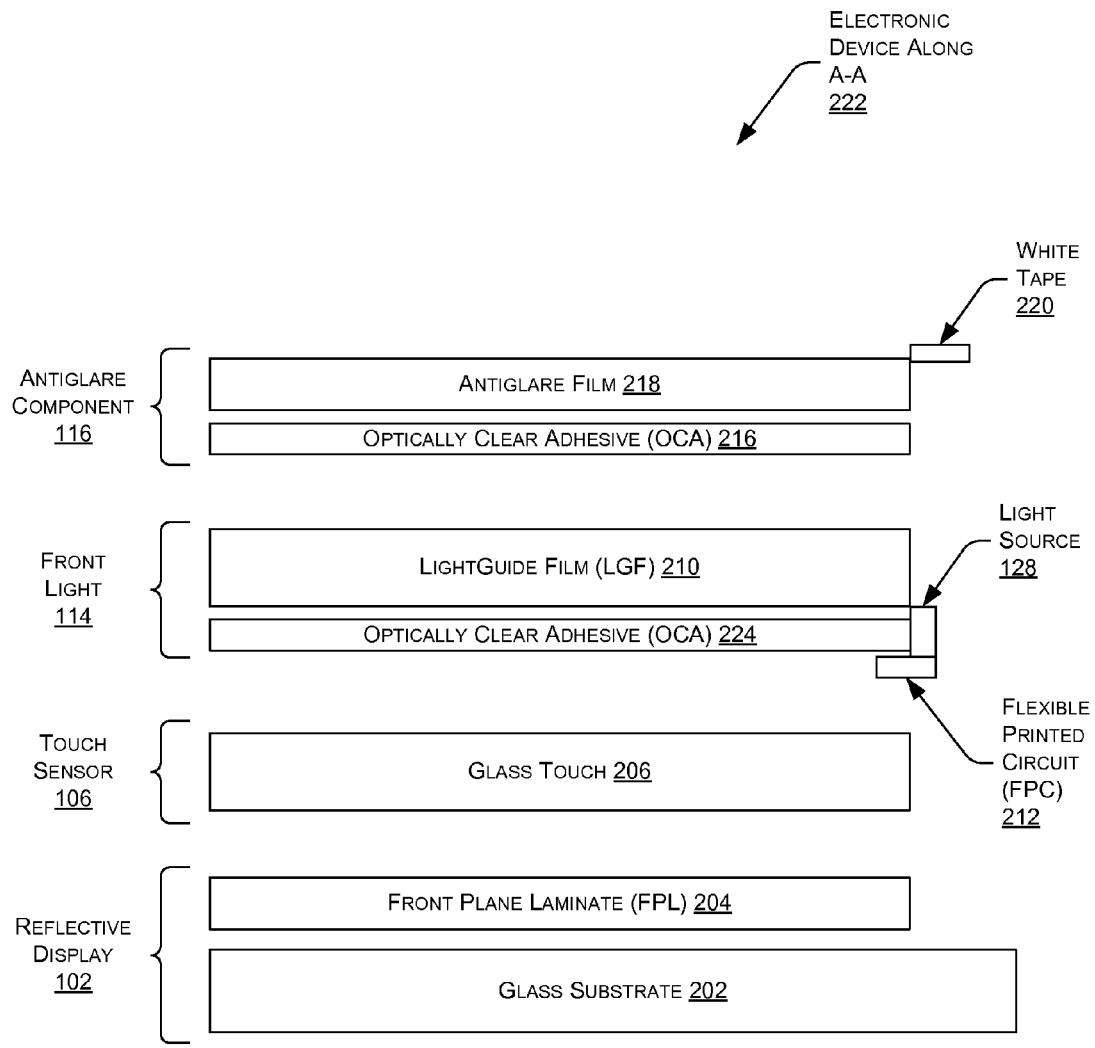

In addition, while FIGS. 2A and 2B describe a lightguide having diffractive elements (in the form of the grating elements), other embodiments may include other types of lightguides, such as those that include refractive elements (e.g., lenslets to outcouple light from a light source). In addition, some embodiments may include respective light sources to light each side of the lightguide.

Also as illustrated, the light source 128 may comprise one or more (e.g., four) LEDs, which may reside toward a bottom edge of the electronic device. By positioning the LEDs along the bottom portion of the display 102 relative to the content being displayed, light from the light source 128 is generally directed away from a user consuming the content and, hence, is not directed into the user's eyes. That is, because users typically hold the device with the top edge further away from the user's eyes than the bottom edge (i.e., with the top edge tilted away from the user, given the user's line of sight to the top edge), the lights positioned on the bottom of the display will generally shine towards the top edge and away from the user's eyes. As such, positioning the LEDs in this manner may decrease the chances of the light being directed into a user's eyes.

The light from the light source generally travels along the plane of the lightguide 126 and the display 102 until it contacts the grating elements 130, at which point the grating elements 130 generally direct the light downwards (and towards) the display 102. In some instances, the multiple LEDs are positioned such that they collectively emulate a single point source. For instance, each LED may emit light over a particular angle that is in the shape of a triangle. The LEDs may be aligned and spaced (relative to one another and relative to an active area of the display) such that these triangles overlap in a manner where the display does not include over bright spots or overly dim spots. Furthermore, in some instances, the lightguide 126 may be notched to make way for actuatable buttons or plungers.

The antiglare component 116, meanwhile, comprises a film that functions to reduce glare of ambient light incident on the electronic device 100. In some instances, the film may comprise a hard-coated polyester and polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display.

The antiglare component may couple to a top surface of the front light 114 via OCA, such as solid OCA, LOCA or the like. In some instances, a refractive index of the OCA atop the front light 114 and a refractive index of the OCA beneath the front light 114 are both less than a refractive index of the lightguide 126 itself. For instance, the difference between the refractive index of the lightguide 126 and the refractive index of each of the OCAs may be at least 0.3 in some instances. Selecting materials having low refractive indices on both sides of the lightguide 126 may result in total internal reflection or near-total internal reflection of light from the light source 128. The antiglare component 116 may, in some instances, also include a UV filter for the purpose of protecting components lower in the stack from UV of the light incident on the electronic device 100.

While FIG. 1 illustrates a few example components, the electronic device 100 may have additional features or functionality. For example, the device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 100 may reside remotely from the device 100 in some implementations. In these implementations, the device 100 may utilize the network interfaces 118 to communicate with and utilize this functionality.

FIG. 2A illustrates a first example of a schematic cross-section 200 of the electronic device 100 along the line A-A from FIG. 1. The cross-section 200 illustrates the antiglare component 116 residing atop the front light 114, which resides atop the touch sensor 106, which resides atop the reflective display 102. As illustrated, in this example the reflective display 102 includes a glass substrate 202 and a front plane laminate (FPL) 204. In some instances, the FPL comprises e-ink capsules, as well as the fluid in which the capsules move up or down in as described above with reference to electronic-paper displays. In addition, the FPL 204 may include a plastic film structure onto which the e-ink is coated using a roll-to-roll process. Thereafter, a conductive transparent electrode plastic film may then be combined with an adhesive layer and a release sheet to form one implementation of the FPL 204.

The touch sensor 106 resides atop the reflective display 102, and includes a glass touch component 206. In instances where the touch sensor 106 comprises a capacitive touch sensor, traces made from Indium tin oxide (ITO), copper, printed ink or the like may reside atop the glass 206. An acrylic material may reside atop the traces for protection, with this a color of this acrylic layer being tuned to ensure that a resulting color of the display 102 viewed by a user is correct. Furthermore, in some instances the device 100 may include a transparent conductor other than, or in addition to, ITO.

As is known, ITO layers in touch sensors essentially comprise rows and columns (e.g., in a diamond shape) of traces. Contrary to the electronic device 100, traditional touch sensors typically include the ITO layer underneath the glass touch component or, potentially, with one layer of the ITO (e.g., the rows) underneath the glass and the other layer (e.g., the columns) atop the glass. As described above, however, the electronic device 100 may include the ITO layer entirely atop the glass touch component 206.

While the ITO layer typically needs protection, the additional dielectric materials above the touch sensor 106 may provide this protection, as shown in the cross-section 200 of the electronic device 100. That is, the front light 114 and the antiglare component 116 may provide protection to the ITO layer. Furthermore, the ITO layer is then filled with a liquid OCA (discussed immediately below), which substantially eliminates the opportunity for air gaps to form in the ITO/fill layer. As is known, air gaps reduce the efficacy and accuracy of the resulting touch sensor. Because the electronic device 100 includes the ITO layer atop the glass touch component 206 (given the additional dielectric material atop the touch sensor 106), the ITO is essentially closer to a user's fingers using the touch sensor 106 and, therefore, the touch sensor 106 may be more effective than if the ITO layer were to reside underneath the glass. Again, the additional dielectric materials atop the touch sensor 116 make placement of the ITO layer atop the glass touch component 206 possible.

Next, liquid optically clear adhesive (LOCA) 208 may be placed atop the glass touch component 206 (and the ITO traces). While illustrated as part of the touch sensor, the LOCA 208 may be separate from the touch sensor 106 in some instances. As described above, during assembly the LOCA may be deposited onto the glass touch 206 and, when the LOCA 208 reaches the corners of the glass touch 206, the corners may be UV-cured. Thereafter, the LOCA 208 on the remaining portion of the glass touch 206 may be UV-cured. As discussed below, while this example includes LOCA, in other instances the LOCA 208 may be replaced with a solid OCA. In either instance, the LOCA or the SOCA may be formed from an acrylic material and/or, in some instances, from silicone. For instance, the LOCA may comprise Loctite® 5192 and/or MSDS made by Nalax3®. The MSDS comprises UV-curable polyurethane acrylates based a formulation comprising of hexamethylene diacrylate, Urethane acrykate oligomer, Acyrlate ester and photoinitator. This formulation may achieve balanced coating properties such as tensile properties, hardness, weatherability, and adhesion. The LOCA may be created by applying the formulation to PMMA rolls using a wet coating method immediately followed by embossing and UV curing (e.g., using a Fusion lamp).

The front light 114 for lighting the reflective display 102 may reside atop the touch sensor 106. A lightguide film (LGF) 210 of the front light 114 may couple to the touch sensor via the LOCA 208. The LGF 210 may include grating elements (or "surface relief forms"), described in further detail below, for directing light from the light source 128 onto the reflective display 102.

FIG. 2A further illustrates that the light source 128 may couple to a flexible printed circuit (FPC) 212. In some instances, the light source 128 (e.g., one or more LEDs) may couple to the FPC 212 via an optically clear adhesive (OCA), such as a solid strip of OCA, LOCA or the like. After the light source 128 is coupled to the FPC 212, the FPC 212 may also couple to the LGF 210 via the OCA 214. In some instances, the FPC 212 may include a light-diffusing reflective coating (e.g., in the form of a white, matte finish), which may help to diffuse and reflect light from the light source 128 and, hence, increase the uniformity of the light across the front light 114 and the display 102.

The LEDs selected for inclusion in the electronic device may have a color that is optimized for the reflective display 102 (and the resulting display of content to the user). For instance, multiple different color temperature LEDs having particular color ratios there between may be selected to ensure a proper color from the collection of LEDs when lighting the display. Furthermore, the color of the LEDs may be tuned over time to compensate for changes in the lightguide 126, as well based on other factors, such as the aging of the LEDs, the environment that the device 100 is or has been used in and the like.

Another layer of OCA 216 (e.g., solid OCA, LOCA, etc.) may reside atop the LGF 210 of the front light 214. An antiglare film 218 of the antiglare component 116 may then be laid atop the OCA 216. In addition, a white tape or 220 other type of light-diffusing reflective coating may be laid along a perimeter of the antiglare film 218, which again may help to diffuse light from the light source 128 and increase the uniformity of the light from the light source 128.

In some instances, the top-most surface of the stack (e.g., a surface of the antiglare component 116 in this implementation) may be treated to provide a particular feel or roughness, such as a feel or roughness that substantially approximates that of paper or that otherwise enhances a feel of the device. In some instances, the top surface is etched, abraded, polished or otherwise treated to provide this feel or roughness.

In some instances, the electronic device may also include a bezel, either atop, underneath, or in lieu of the white tape or other light-diffusing reflective coating. In either instance, the bezel may be optically connected to the other elements in the stack. For instance, the bezel may couple to the antiglare component 116 or to another component in the stack via SOCA, LOCA or via any other means. The bezel may function to absorb stray light from the light source 128, hence maintaining the uniformity or smoothness of the light propagated by the front light 114 onto the display 102. To absorb light in this manner, in some instances the bezel is black or another dark color. Additionally or alternatively, the device 100 may include black or dark glue (or, a marker, an adhesive, or the like) around the edges of the display stack to similarly reduce reflections off of the edges of the front light 114 (i.e., to reduce the amount of light that escapes).

In one implementation, the resulting stack of components illustrated in FIG. 2A has a thickness of approximately 2.5 millimeters. The reflective display 102 and the glass touch component 206 may have a thickness of approximately 1.58 mm, while the LOCA deposited thereon may have an approximate thickness of 130 microns. The LGF 210 may have an approximate thickness of 506 microns, while the OCA thereon may have a thickness of approximately 50 microns. Finally, the antiglare film 218 may have an approximate thickness of 195 microns.

FIG. 2B illustrates a second example schematic cross-section 222 of the electronic device 100 across the line A-A from FIG. 1. The cross-section 222 again illustrates the antiglare component 116 residing atop the front light 114, which resides atop the touch sensor 106, which resides atop the reflective display 102. In this example, a bottom surface of the front light 114 may be laminated with a solid OCA 224, which then couples the front light 114 to a top surface of the glass touch component 206. The FPC 212 coupled to the light source 128 may also couple to the bottom surface of the LGF 210 via the OCA 224. In this example, the OCA 224 may include a thickness of approximately 50 microns, such that an overall thickness of the component stack may be approximately 2.4 mm.

While FIGS. 2A-2B illustrate two example stacks, other implementations may utilize the same or different components in the same or different orders. For instance, one implementation may include the glass touch component 206 on top of the device (with or without the antiglare component on top of that), with the touch-sensors traces (e.g., the ITO) residing underneath the glass. The frontlight may reside under the touch sensor, with the reflective display residing underneath the frontlight. Furthermore, in some examples, the stack may not include a reflective display at all. Instead, the frontlight 126 may light a component without a display, such as a keyboard, which may reside in place of the reflective display in the example stacks described herein.

Figure 3:
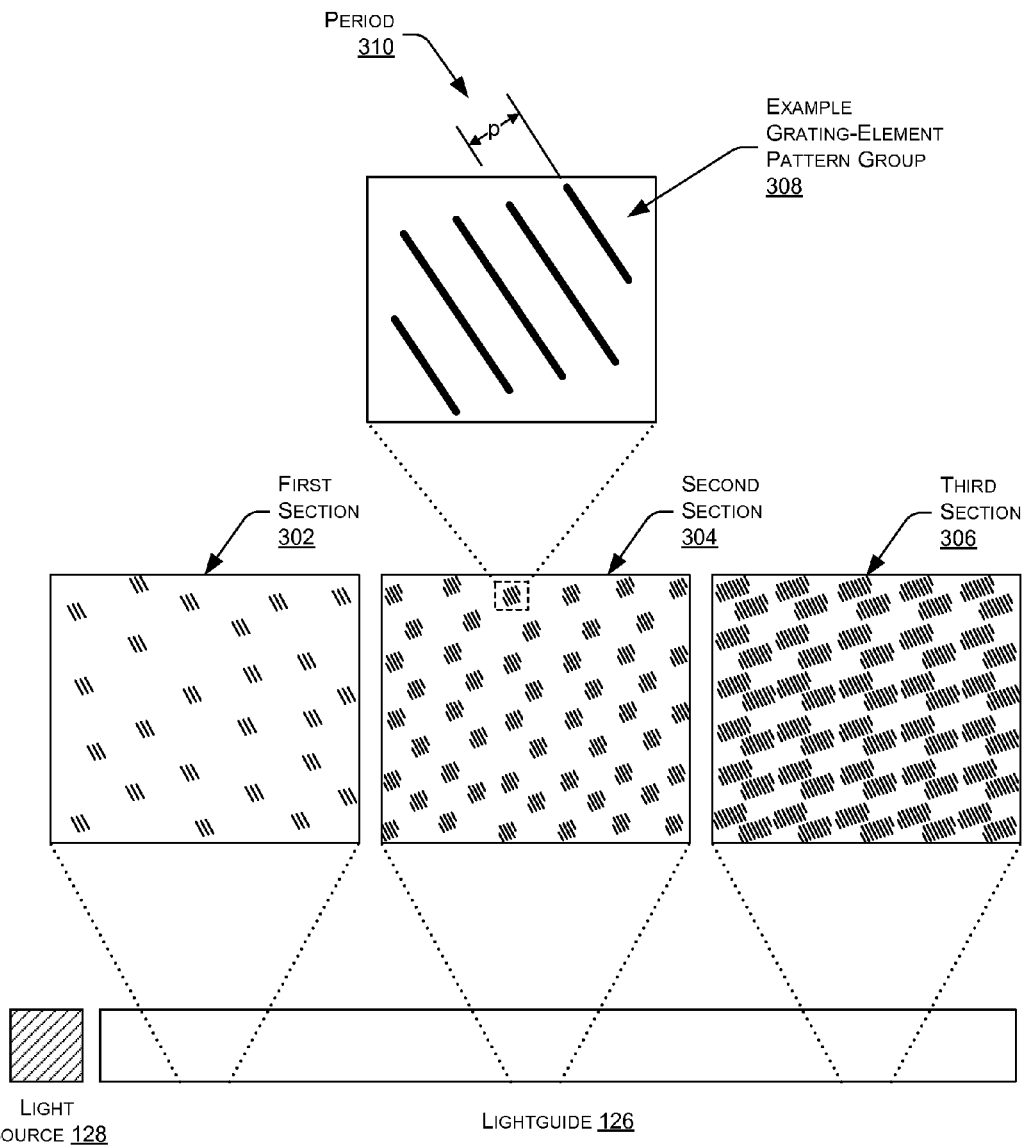
FIG. 3 illustrates an example lightguide that includes different sections having respectively different patterns of grating elements for propagating light from a light source.

FIG. 3 illustrates an example lightguide 126 adjacent to a light source 128. As illustrated, the lightguide 126 includes different sections having respectively different patterns of grating elements for propagating light from a light source. This example illustrates three different sections 302, 304 and 306, although the lightguide 126 may include any other number of sections and/or may continuously vary across the length of the lightguide 126.

In the illustrated example, the nearer the section of the lightguide 126 to the light source 128, the fewer number of grating elements that respective section includes. As such, the first section 302 that is nearest the light source 128 is shown to include fewer grating elements than the second section 304, which in turn includes fewer grating elements than the third section 306. Furthermore, as illustrated the orientation of the grating elements within the respective sections may vary to ensure propagation of the light to each portion of the display. Some dithering may also be added to the grating-element patterns to avoid the Moiré-effect.

FIG. 3 illustrates an example grating-element pattern group 308 for propagating light from the light source 128 onto the display 102. As illustrated, the grating elements within the group 308 may comprise parallel lines that are spaced from one another via a uniform period 310. In one implementation, the lines have a width of 4 microns and a depth of 1.5 microns, and are spaced 12 microns from one another. As discussed above, the number of individual grating elements of the group 308 and/or characteristics (e.g., length, depth, orientation, etc.) of the elements may be determined at least in part with reference to the group's distance from the light source 128, with the number of lines increasing with increasing distance. In addition, a collection of grating element-pattern groups may form a grating-element pattern. For instance, the collection of illustrated grating element-pattern groups in the first section 302 may comprise a first pattern, the collection of illustrated grating element-pattern groups in the second section 304 may form a second pattern, and the collection of grating element-pattern groups in the third section 306 may form a third pattern.

Each grating element may either be raised (i.e., a bump) or may represent a groove in the substrate of the lightguide 126. Furthermore, while illustrated as parallel lines, the grating elements may have a different profile in other implementations. For instance, the grating elements may have profiles that are binary, slanted, blazed, sinusoidal, x-shaped or the like. In some instances, different pattern groups have different profiles. Grating elements within a grating element pattern group may differ from one another. For instance, grating elements within a pattern group may have different depths, lengths, orientations, shapes or the like.

In addition, the grating elements may formed in any number of ways, such being embossed in a lacquer, injection molded as part of the manufacture of the lightguide 126, directly embossed onto the substrate of the lightguide 126 or the like. In other examples, the manufacture of the grating elements includes continuous or discrete casting methods (UV or thermal curing), compression molding, continuous or discrete embossing, such as hard embossing, soft embossing and UV embossing and the like. Melt film can also be used. Although many manufacturing processes may be utilized, some may be particularly suitable to manufacturing particular embodiments. For example, blazed type structural profiles may be manufactured by means of roll-to-roll UV-embossing or a melt film method in order to achieve accurate and high quality replication. Different kinds of figures and masks can be printed or laminated on the lightguide 126, optionally including electrical contact and circuitries.

After the grating elements are formed, the lightguide 126 can be cut to desired shapes directly from a roll or a film by means of laser, die cutting and/or other means. Also, other optical features can be manufactured during the cutting process. Such optical features particularly include narrow boundary lines, which can be reflecting or directing light for a particular area(s), or directing/diffusing light in the first part of lightguide. This cutting process can be completed in the roll-to-roll process with very short unit times and costs.

Figure 4:
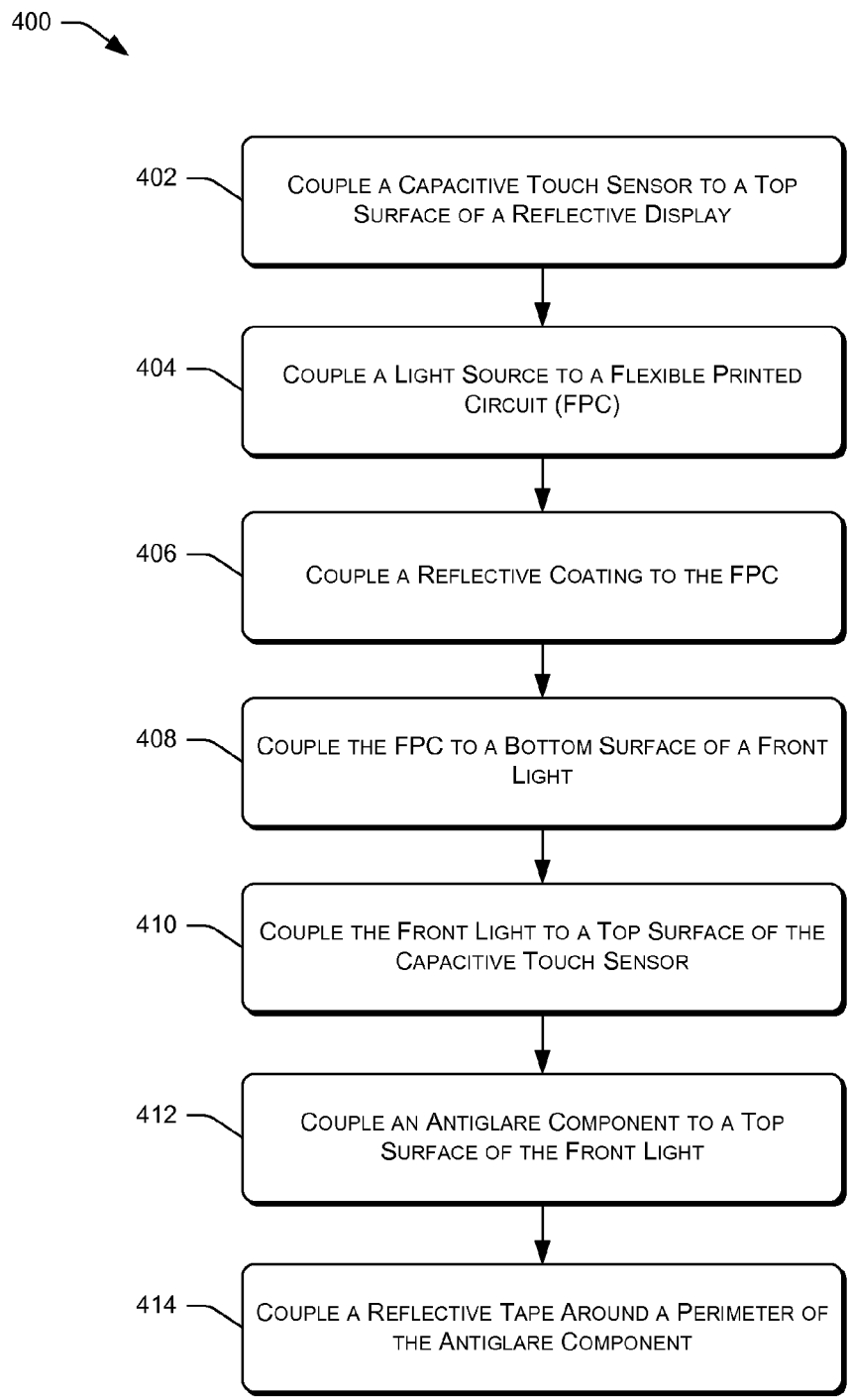
FIG. 4 illustrates an example flow diagram of assembling an electronic device that includes a reflective display, a touch sensor atop the reflective display, a front light atop the capacitive touch sensor and an antiglare component atop the front light.

FIG. 4 illustrates an example process 400 for assembling an electronic device including the component stack described herein. The order in which the operations are described is not intended to be construed as a limitation, and any number of the described operations can be combined in any order and/or in parallel to implement the process.

The process 400 includes, at 402, coupling a capacitive touch sensor to a top surface of a reflective display. Thereafter, the process 400 includes assembling a light source and a flexible printed circuit (FPC) in a separate stack before attaching this stack to the remaining components of the device. At 404, for instance, the process 400 includes coupling a light source (e.g., an LED) to the FPC, such as via a strip of solid optically clear adhesive (SOCA). At 406, the process 400 then includes coupling a light-diffusing reflective coating to the FPC, which may increase the diffusion and uniformity of light from the light source. At 408, the process 400 includes coupling the FPC (with the light source and light-diffusing reflective coating attached) to a front light (e.g., a bottom surface of the front light, a top surface, etc.).

At 410, the process 400 then includes coupling the front light to a top surface of the capacitive touch sensor. This may include depositing and curing a layer of liquid optically clear adhesive (LOCA) atop the capacitive touch sensor and laying the front light atop the LOCA. At 412, the process then includes coupling an antiglare component to a top surface of the front light, such as via a strip of solid OCA. Finally, the process 400 includes, at 414, coupling a reflective tape (e.g., a white, reflective tape) around at least a portion of a perimeter of the antiglare component to act as a diffuser and reflector of light from the light source.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device comprising;
   one or more processors;
   memory, coupled to the one or more processors and storing at least one content item;
   a reflective display configured to display the content item and comprising a top surface;
   a capacitive touch sensor coupled at least in part to the top surface of the reflective display and configured to receive touch input, the capacitive touch sensor including a top surface;
   a lightguide coupled at least in part to the top surface of the capacitive touch sensor and configured to receive light from a light source at an edge of the lightguide and propagate the light onto the top surface of the reflective display, the lightguide including, a substrate, a layer of lacquer applied to the substrate, and grating elements formed in the layer of lacquer; and
   an antiglare component coupled at least in part to a top surface of the lightguide.

2. An electronic device as recited in claim 1, wherein the lightguide couples at least in part to the top surface of the capacitive touch sensor via one or more of solid optically clear adhesive (SOCA) or liquid optically clear adhesive (LOCA).

3. An electronic device as recited in claim 1, wherein the antiglare component couples at least in part to the top surface of the lightguide via one or more of solid optically clear adhesive (SOCA) or liquid optically clear adhesive (LOCA).

4. An electronic device as recited in claim 1, wherein:
   the light source comprises at least one light-emitting diode (LED); and
   the electronic device further comprises a flexible printed circuit (FPC) coupled to the LED via one or more of solid optically clear adhesive (SOCA) or liquid optically clear adhesive (LOCA).

5. An electronic device as recited in claim 4, wherein the FPC also couples to the lightguide via the SOCA or the LOCA that couples the FPC to the LED.

6. An electronic device comprising:
   a reflective display configured to display content;
   a touch sensor coupled to a top surface of the reflective display and configured to receive touch input; and
   a front light coupled to a top surface of the touch sensor, the front light including multiple sections, each of the multiple sections including a different pattern of grating elements to direct light onto the reflective display.

7. An electronic device as recited in claim 6, wherein the reflective display comprises an electronic paper display or a reflective LCD display.

8. An electronic device as recited in claim 6, wherein the touch sensor comprises a capacitive touch sensor or an interpolating force sensitive resistance (IFSR) touch sensor.

9. An electronic device as recited in claim 6, wherein the front light directly couples to the touch sensor via one or more of liquid optically clear adhesive (LOCA) or solid optically clear adhesive (SOCA).

10. An electronic device as recited in claim 6, further comprising an antiglare component coupled to a top surface of the front light.

11. An electronic device as recited in claim 10, wherein the antiglare component couples to the front light via one or more of solid optically clear adhesive (SOCA) or liquid optically clear adhesive (LOCA).

12. An electronic device as recited in claim 10, wherein:
the front light couples to the touch sensor via a first optically clear adhesive (OCA);
the antiglare component couples to the front light via a second OCA; and
respective refractive indices of the first and second OCAs are less than a refractive index of the front light.

13. An electronic device as recited in claim 10, further comprising a light-diffusive reflective tape residing around at least a portion of a perimeter of the antiglare component, the reflective tape configured to propagate light from a light source onto the reflective display.

14. An electronic device as recited in claim 6, wherein the front light comprises a light source and a lightguide, the lightguide to receive light from the light source and direct the light onto the reflective display.

15. An electronic device as recited in claim 14, wherein the lightguide comprises a substrate, a layer of lacquer on a top surface of the substrate, and grating elements formed within the layer of lacquer.

16. An electronic device as recited in claim 6, wherein the electronic device comprises a top edge and a bottom edge, and further comprising one or more light emitting diodes (LEDs) residing adjacent the bottom edge of the electronic device and configured to provide light for propagation by the front light onto the reflective display.

17. An electronic device as recited in claim 6, wherein:
the front light includes a light source and a lightguide;
the electronic device further comprises a flexible printed circuit (FPC); and
the FPC couples to the light source.

18. An electronic device as recited in claim 17, wherein the FPC couples to the light source and the lightguide via one or more of solid optically clear adhesive (SOCA) or liquid optically clear adhesive (LOCA).

19. An electronic device as recited in claim 17, wherein the FPC includes a light-diffusing reflective coating to increase the propagation of the light by the lightguide onto the reflective display.

20. An electronic device as recited in claim 6, wherein a first section of the multiple sections comprises fewer grating elements than a second section of the multiple sections.

21. An electronic device as recited in claim 6, wherein a first section of the multiple sections comprises fewer grating elements than a second section of the multiple sections, and the second section of the multiple sections comprises fewer grating elements than a third section of the multiple sections.

22. An electronic device as recited in claim 21, wherein the front light comprises a light source for providing the light to the reflective display, and wherein the first section is nearer to the light source than the second and third sections and the second section is nearer the light source than the third section.

23. An electronic device as recited in claim 6, wherein the front light includes multiple grating-element pattern groups for directing the light onto the reflective display, and wherein a spacing between each grating element of at least one of the grating-element pattern groups is substantially uniform.

24. A method for assembling at least a portion of an electronic device that includes a touch sensor coupled to a top surface of a reflective display, the method comprising:
coupling a front light to a top surface of the touch sensor, the front light configured to propagate light from a light source onto the reflective display;
coupling an antiglare component onto a top surface of the front light; and
coupling light-diffusive reflective tape residing around at least a portion of a perimeter of the antiglare component, the light-diffusive reflective tape configured to reflect light from a light source onto the reflective display.

25. A method as recited in claim 24, wherein the front light is coupled to the top surface of the touch sensor via liquid optically clear adhesive (LOCA).

26. A method as recited in claim 25, wherein the coupling of the front light to the top surface of the touch sensor comprises placing the LOCA on at least a portion of a perimeter of the top surface of the touch sensor and curing the LOCA at the portion of the perimeter.

27. A method as recited in claim 26, wherein the coupling of the front light to the top surface of the touch sensor further comprises curing LOCA on a remainder of the front surface of the touch sensor at least partly subsequent to curing the LOCA at the portion of the perimeter.

28. A method as recited in claim 25, wherein the coupling of the front light to the top surface of the touch sensor comprises placing the LOCA near a center of the top surface of the touch sensor, pressing the LOCA outwards towards a perimeter of the top surface of the touch sensor and curing the LOCA.

29. A method as recited in claim 24, wherein the touch sensor comprises a capacitive touch sensor or an interpolating force sensitive resistance (IFSR) touch sensor.

30. A method as recited in claim 24, wherein the antiglare component is coupled to the top surface of the front light via one or more of solid optically clear adhesive (SOCA) or liquid optically clear adhesive (LOCA).

31. A method as recited in claim 24, further comprising:
coupling a light source to a flexible printed circuit (FPC); and
coupling the FPC to the front light.

32. A method as recited in claim 31, wherein the light source couples to the FPC and the FPC couples to the front light via one or more of solid optically clear adhesive (SOCA) or liquid optically clear adhesive (LOCA).

33. A method as recited in claim 31, further comprising coupling a light-diffusing reflective coating to the FPC.

34. A method as recited in claim 24, further comprising etching, abrading, or polishing a top surface of the antiglare component.

* * * * *